(12) United States Patent
Lim

(10) Patent No.: US 8,828,588 B2
(45) Date of Patent: *Sep. 9, 2014

(54) BATTERY MODULE

(75) Inventor: Young-Bin Lim, Yongin-si (KR)

(73) Assignees: Samsung SDI Co., Ltd, Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 478 days.

This patent is subject to a terminal disclaimer.

(21) Appl. No.: 13/067,356

(22) Filed: May 26, 2011

(65) Prior Publication Data

US 2012/0094156 A1    Apr. 19, 2012

(30) Foreign Application Priority Data

Oct. 13, 2010    (KR) .......................... 10-2010-0099846

(51) Int. Cl.
*H01M 2/12*    (2006.01)

(52) U.S. Cl.
CPC . *H01M 2/12* (2013.01); *Y02E 60/12* (2013.01)
USPC .............. 429/159; 429/156; 429/100; 429/82

(58) Field of Classification Search
None
See application file for complete search history.

(56) References Cited

U.S. PATENT DOCUMENTS

| 3,704,440 | A | * | 11/1972 | Bradley ....................... 439/519 |
| 4,248,944 | A | * | 2/1981 | Smilanich .................... 429/185 |
| 5,688,612 | A | * | 11/1997 | Mrotek et al. ................. 429/89 |
| 2007/0134524 | A1 | | 6/2007 | Cho et al. |
| 2007/0154781 | A1 | * | 7/2007 | Choi ............................... 429/53 |
| 2008/0145754 | A1 | * | 6/2008 | Partington et al. ............ 429/185 |
| 2009/0061289 | A1 | | 3/2009 | Hamada et al. |
| 2011/0117401 | A1 | * | 5/2011 | Lee et al. ........................ 429/82 |

FOREIGN PATENT DOCUMENTS

| JP | 2002-151025 A | 5/2002 |
| JP | 2006-049136 A | 2/2006 |
| JP | 2009-170258 A | 7/2009 |
| JP | 2010-205509 A | 9/2010 |
| KR | 10-2001-0037119 A | 5/2001 |
| KR | 10-2009-0128602 A | 12/2009 |

OTHER PUBLICATIONS

Korean Office Action in KR 10-2010-0099846, dated Dec. 30, 2011 (LIM).
Korean Office Action in KR 10-2010-0099846, dated Aug. 31, 2012 (LIM).

* cited by examiner

*Primary Examiner* — Milton I Cano
*Assistant Examiner* — Wojciech Haske
(74) *Attorney, Agent, or Firm* — Lee & Morse, P.C.

(57) ABSTRACT

A battery module includes a plurality of battery cells arranged in a first direction, the battery cells having vents, a housing accommodating the battery cells, and an insulating member corresponding to the vents.

14 Claims, 4 Drawing Sheets

BATTERY MODULE

BACKGROUND

1. Field

Example embodiments relate to a battery module including a plurality of battery cells.

2. Description of the Related Art

Recently, high-output battery modules using a non-aqueous electrolyte having high energy density have been developed. The high-output battery modules implement high-capacity by connecting a plurality of battery cells in series, e.g., to be used for driving apparatuses requiring a large power. For example, such high-output battery modules with high-capacity may be used to drive motors of electric vehicles.

A battery cell in a battery module may include an electrode assembly composed of an anode plate and a cathode plate, so energy may be produced by an electrochemical reaction between the plates and the electrolyte. Gas may be produced by a sub-reaction of the electrochemical reaction in the battery cells.

SUMMARY

Embodiments are directed to a battery module, which substantially overcomes one or more of the problems due to the limitations and disadvantages of the related art.

It is therefore a feature of an embodiment to provide a battery module with a structure that can easily control the gas produced and released in a plurality of battery cells.

It is therefore another feature of an embodiment to provide a battery module that can prevent leakage of the gas produced in a plurality of battery cells.

At least one of the above and other features and advantages may be realized by providing a battery module, including a plurality of battery cells arranged in a first direction, the battery cells having vents, a housing accommodating the battery cells, and an insulating member corresponding to the vents.

The insulating member may have a plurality of openings positioned to correspond to the vents. The openings of the insulating member may be larger than the vents. The insulating member may include a heat resistant material. The insulating member may be a gasket. The insulating member may be external to the battery cells and may extend along the first direction to overlap the battery cells, the insulating member including a plurality of openings overlapping the vents. The openings of the insulating member may be equal to or larger than widths of the vents.

The battery module may further include a cover covering the insulating member. A width of the insulating member may be larger than a width of the cover along a second direction, the second direction being different than the first direction. The cover may have a hexahedral shape with an open side, the open side of the cover being positioned to face the insulating member. The cover and the insulating member may define a gas channel therebetween. The battery module may further include an outlet at one side of the cover, the outlet being connected to the gas channel. The cover may contact the insulating member and enclose a space therewith, the space overlapping the vents of the battery cells. The insulating member may be between the cover and the battery cells and may include a plurality of openings, the openings of the insulating member being aligned with corresponding vents. The space between the cover and the insulating member may extend along all the vents of the battery cells, the space and the vents being in fluid communication with each other. The battery module may further include an adhesive member between the insulating member and the battery cell. The insulating member may include silicon or fluoride resin rubber. The housing may include a pair of end plates spatially spaced apart from each other to accommodate the battery cells, and one or more connecting members that connect the pair of end plates. The connecting members may include side brackets connecting the pair of end plates and a bottom bracket connecting bottoms of the end plates.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
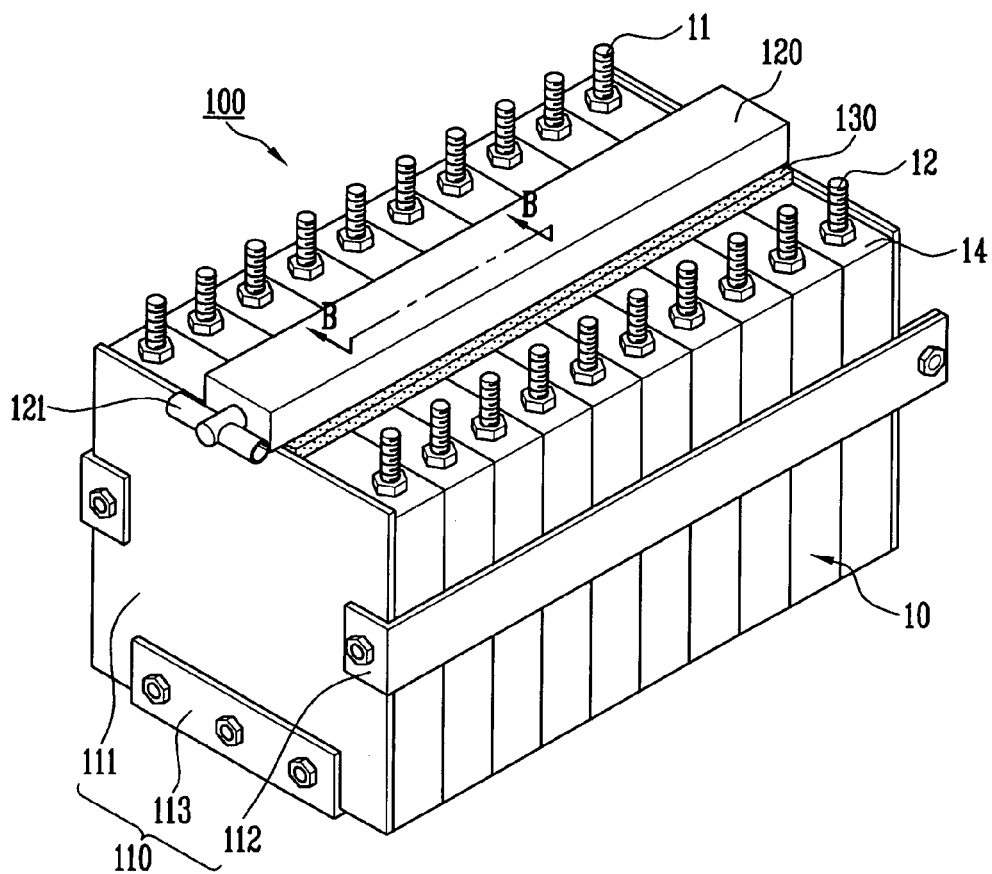
FIG. 1 illustrates a perspective view of a battery module according to an embodiment.

Korean Patent Application No. 10-2010-0099846, filed on Oct. 13, 2010, in the Korean Intellectual Property Office, and entitled: "BATTERY MODULE" is incorporated by reference herein in its entirety.

Advantages and features of example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element or substrate, it can be directly on the other element or substrate, or intervening elements may also be present. Further, it will be understood that when an element is referred to as being "between" two elements, it can be the only element between the two elements, or one or more intervening elements may also be present. Further, connection of one element with another element may include a direct connection, an electric connection, and/or indirect connection therebetween. Like reference numerals refer to like elements throughout.

Hereinafter, example embodiments are described with reference to the FIGS. 1 to 3B. FIGS. 1 to 3B illustrate views of an insulating member and a battery module according to an embodiment.

Figure 2:
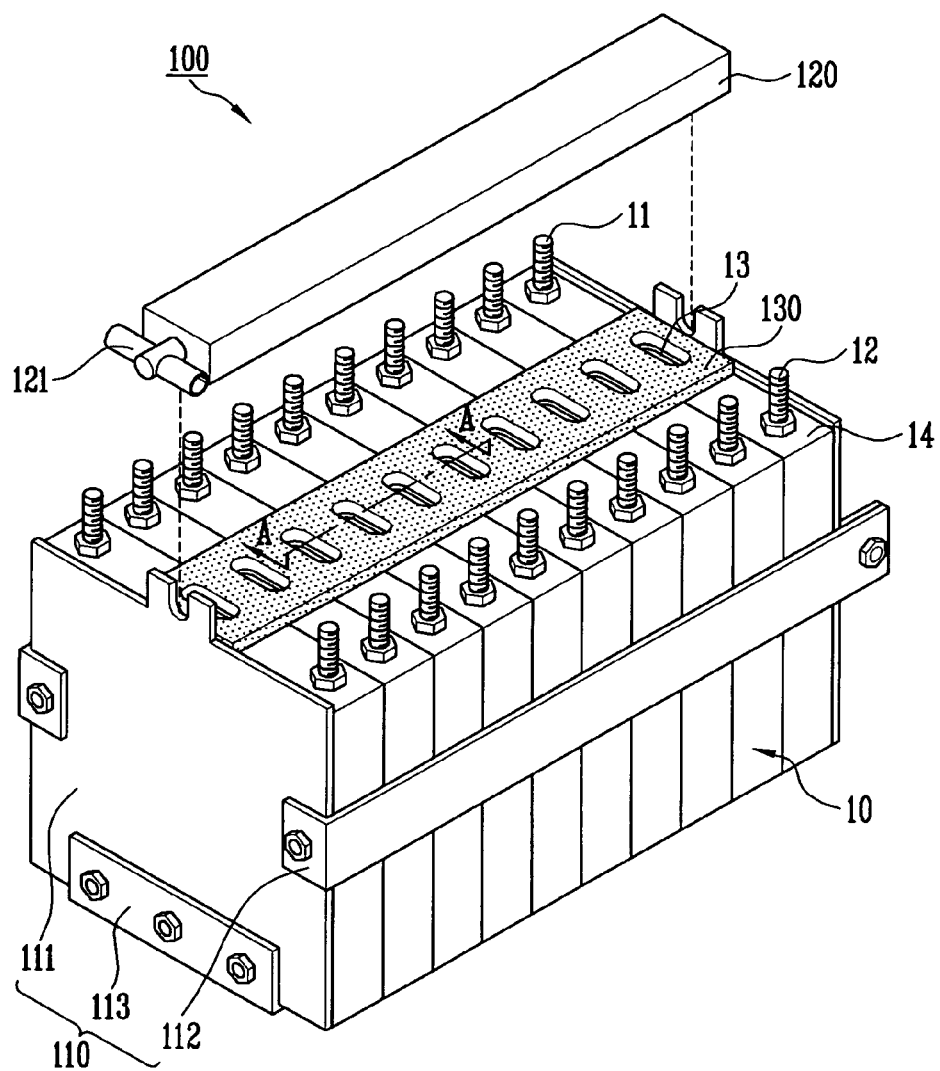
FIG. 2 illustrates an exploded perspective view of the battery module in FIG. 1.

FIG. 1 illustrates a perspective view of a battery module according to an embodiment. FIG. 2 illustrates an exploded perspective view of the battery module shown in FIG. 1.

Referring to FIGS. 1 and 2, a battery module 100 according to an embodiment may include a plurality of battery cells 10 arranged in one direction and having vents 13, an insulating member 130 disposed above the vents 13, and a housing 110 accommodating the battery cells 10. The insulating member 130 may be an integrated unit with a plurality of openings 131 (FIG. 3A) corresponding to the vents 13.

It is noted that FIGS. 1 and 2 exemplify battery cells 10 that are rectangular lithium secondary batteries. However, example embodiments are not limited thereto and various shapes of batteries, e.g., lithium polymer batteries or cylindrical batteries, may be applied to the example embodiments.

As illustrated in FIGS. 1-2, the battery cell 10 may include a battery case with an opening and a cap plate 14 closing the opening. The battery case may accommodate an anode plate, a cathode plate, an electrode assembly including a separator disposed between the plates, and an electrolyte. An anode terminal 11 connected with the anode plate and a cathode terminal 12 connected with the cathode plate protrude outward through the cap plate 14 from both ends of the cap plate 14. The anode plate and the cathode plate of the electrode assembly produce energy by reacting with the electrolyte, so energy is transmitted outside the battery case through the anode terminal 11 and the cathode terminal 12.

Further, as illustrated in FIG. 2, the vents 13 of the battery cells 10 may be disposed between respective anode terminals 11 and cathode terminals 12 of the cap plates 14. For example, each battery cell 10 may include a vent 13 in the cap plate 14, so the vent 13 may be disposed between the anode terminal 11 and the cathode terminal 12. As such, a plurality of vents 13 may be disposed in the battery module 100 in respective battery cells 10, so adjacent vents 13 may be spaced apart from each other along a first direction. The vent 13 may function as a path through which gas is discharged from the battery cell 10. That is, when the pressure of the gas produced in the battery cell 10 is above a predetermined level, the gas may be discharged through the vent 13 to prevent the battery cell 10 from being broken by the internal pressure.

The battery cells 10 according to this embodiment may be arranged in one direction. That is, the wide front surfaces of the battery cells 10 may be arranged in parallel to face each other and be adjacent to each other along the first direction. For example, the vents 13 may be provided at center portions of the cap plates 14 of the battery cells 10, so the vents 13 may be arranged into a substantially straight line in accordance with the arranged battery cells 10, i.e., a straight line along the first direction. The anode terminal 11 and the cathode terminal 12 of two adjacent battery cells 10 may be electrically connected through a bus-bar (not shown), e.g., the bus-bar may be made of nickel, etc.

The housing 110 of the battery module 100 may include a pair of end plates 111 spatially spaced apart from each other in the first direction and a plurality of connecting members connecting the pair of end plates 111. For example, the connecting members may include side brackets 112 connecting the sides of the end plates 111 and a bottom bracket 113 connecting the bottoms of the end plates 111. A plurality of battery cells 10 may be positioned between the pair of end plates 111.

Each one of the pair of end plates 111 is in surface contact with a respective outermost battery cell 10 and presses inward the battery cells 10. Further, the side brackets 112 may be connected to one end and the other end of the pair of end plates 111 and may support both sides of the battery cells 10. In this configuration, the bottoms of the battery cells 10 may be supported by the bottom bracket 113, and both ends of the bottom bracket 113 may be connected to the pair of end plates 111.

Further, the battery cells 10 supported by the end plates 111, side plates 112, and bottom plate 113 may be arranged such that the anode terminals 11 and the cathode terminals 12 are alternately arranged. As such, the battery cells 10 may be connected in series by the bus-bar. The connection structure and the number of battery cells 10 may be changed in various ways in accordance with the design of the battery module 100.

As further illustrated in FIGS. 1-2, a cover 120 may be disposed on the insulating member 130. The cover 120 may have an open side, i.e., may include five faces arranged to have a hollow interior, and may cover the insulating member 130. That is, the open side of the cover 120 may be disposed toward the insulating member 130.

In detail, the cover 120 may be a hollow hexahedron substantially corresponding to the insulating member 130. As the cover 120 includes a hollow space S above the insulating member 130 (FIG. 3B), the cover 120 may define a gas channel for gas in close contact with the insulating member 130, i.e., gas discharged from the battery cells 10 and transferred through the vents 13 toward the insulating member 130 and the cover 120. In other words, the hollow space S enclosed between the cover 120 and the insulating member 130 may function as a gas channel that extends, e.g., continuously, along the first direction to overlap the vents 13 of the battery module 100. Further, the cover 120 may include an outlet 121 connected with the gas channel to discharge gas released from the battery cells 10 to the outside.

In detail, as the battery cell 10 is charged/discharged, gas may be produced by the byproduct of the plates and the electrolyte in the battery cell 10. The gas may be discharged through the vents 13 and through the openings 131 of the insulating member 130 toward the cover 120, i.e., into the gas channel. The gas may be discharged from the cover 120 to the outside through the outlet 121. For example, the outlet 121 may preferably be formed in a T-shape, e.g., the T-shaped outlet 121 may protrude from one side of the cover 120 with the left and right sides open and extending perpendicularly to the cover 120. In other words, the T-shaped outlet 121 may be positioned at an outermost edge of the battery module 100, so the gas may be discharged through the T-shaped outlet 121 to the left and right in parallel with the wide surfaces of the end plates 111, i.e., the gas may be discharged in a direction other than the first direction.

In general, the battery modules 100 may be connected in a set to be used to generate high power. For example, the battery modules 100 may be connected in a set along the first direction, such that the end plates 111 of the adjacent battery modules 100 face each other. Further, the space between the adjacent battery modules 100 along the first direction may be decreased to minimize the volume of the battery modules 100. Since the gas outlet 121 of the cover 120 is formed in a T-shape, i.e., the gas may be discharged through the gas outlet 121 to the left and right in parallel with the end plates 111 in a direction other than the first direction, the space between the adjacent battery modules 100 along the first direction may be minimized without influencing gas discharge. That is, the gas discharge may occur between adjacent battery modules 100 through the left and right sides of the T-shaped gas outlet 121.

Further, in the battery pack 100 according to example embodiments, it is preferable that a width of the insulating member 130 along a second direction is larger than a width of the cover 120 along the second direction. It is noted that the second direction is perpendicular to the first direction and extends in parallel to a line connecting anode and cathode terminals 11 and 12 of a same battery cell 10. When the width of the insulating member 130 is smaller than the width of the cover 120, the cover 120 and the insulating member 130 may unstably contact each other, thereby causing gas leakage therebetween.

Figure 3A:
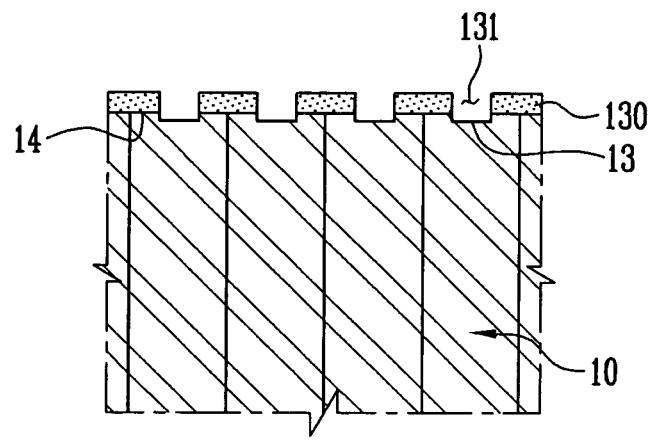
FIGS. 3A and 3B illustrate cross-sectional views along lines A-A and B-B of FIGS. 2 and 1, respectively.
Figure 3B:
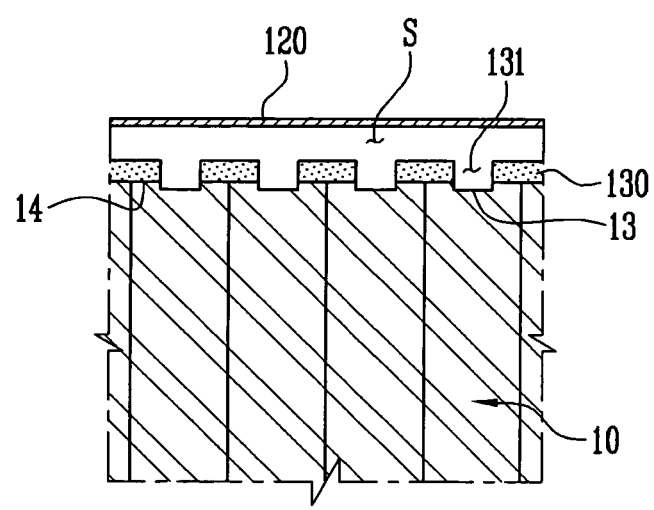

Referring to FIGS. 3A and 3B, the battery cells 10 may be received such that the vents 13 of the cap plates 14 are exposed through the opening of the housing 110 and the insulating member 130 may include openings 131 corresponding to the vents 13. As discussed previously, the vents 13 may be formed at center portions of respective cap plates 14 of the battery cells 10 and may be arranged into a substantially straight line traversing the battery cells 10.

The insulating member 130 may be integrally seated on the battery cells 10, so the openings 131 may be formed in the insulating member 130 to correspond to, e.g., overlap, the vents 13. For example, the openings 131 may be sized to correspond to the vents 13 of the battery cells 10. For example, the openings 131 may overlap, e.g., completely overlap, and have substantially same widths along the first direction as the vents 13.

In detail, the gas produced in the battery cells 10 is discharged outside through the vents 13 and the openings 131 of the insulating member 130, i.e., which correspond to the vents 13, into the gas channel defined between the cover 120 and the insulating member 130, i.e., the hollow space S in FIG. 3B. Therefore, when the size, i.e., respective widths along the first and second directions, of the openings 131 is smaller than that of the vents 13 of the battery cells 10, the passage through which the gas is discharged is reduced, thereby triggering non-smooth, i.e., uneven, gas discharge and/or gas leakage, i.e., excessive gas may be discharged not through the outlet 121 of the cover 120. Therefore, it is preferable that the openings 131 of the insulating member 130 are not smaller than the vents 13.

The insulating member 130 may be disposed individually for each of the battery cells 10, e.g., a separate insulating member 130 with an opening 131 may be positioned to correspond to each battery cell 10, or the insulating member 130 may be an integrated unit, i.e., a single continuous unit overlapping a plurality of battery cells 10 and including a plurality of openings 131 aligned with respective battery cells 10. When the insulating member 130 is integrally disposed, e.g., to overlap as a single unit a plurality of battery cells 10, it may be possible to simultaneously overlap, e.g., close, all the vents 13 of the battery cells 10.

In detail, low-capacity battery cells 10 are small, and the widths, e.g., along the first direction, of the cap plates 14 of the battery cells 10 and the vents 13 are small. Therefore, when the size of the battery cells 10 is small, the working efficiency for individually aligning each separate insulating member 130 with a corresponding vent 13 may be reduced, thereby increasing a defect ratio and reducing the productivity of the battery module 100. Therefore, in this case, use of an integrated insulating member 130 to overlap, e.g., close, all the vents 13 simultaneously may increase the productivity of the battery module 100.

The insulating member 130 may be a heat resistant member and may be a gasket. For example, the insulating member 130 may be made of silicon or a fluoride resin rubber.

The insulating member 130 may seal, e.g., close, the opening of the cover 120 to define the gas channel therebetween. Therefore, when the battery cells 10 emit heat during charging/discharging, e.g., the battery cells 10 may emit high-temperature heat around them, melting of the heat resistant insulating member 130 on the battery cells 10 may be prevented or substantially minimized. As such, sealability between the insulating member 130 and the cover 120 may be improved, e.g., as compared to a non-heat resistant insulating member that melts on the battery cells 10, thereby reducing gas leakage.

In general, the outer case of the battery cells 10 is made of, e.g., metal, and the cover 120 is made of, e.g., plastic resin. When the battery cells 10 and the cover 120 are in contact, the battery cell 10 and the cover 120 may not easily form a smooth and uniform surface contact because they are made of different materials, thereby causing gas leakage through the weak contact portion. According to example embodiments, however, use of the insulating member 130, e.g., a gasket, between the battery packs 10 and the cover 120, may facilitate and maintain sealability between the battery cells 10 and the cover 120.

Figure 4:
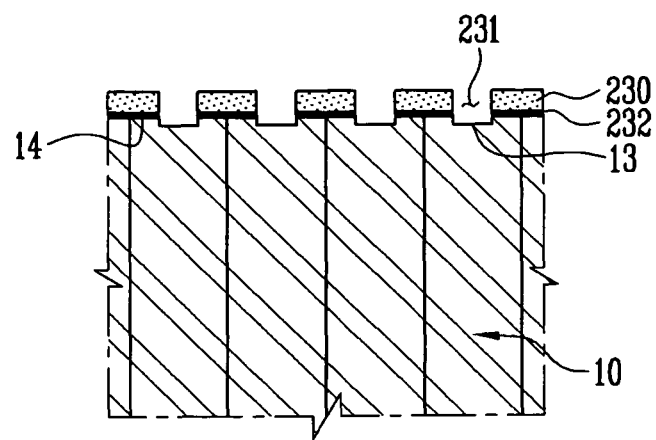
FIG. 4 illustrates a partial cross-sectional view of a battery module according to another embodiment.
Figure 5:
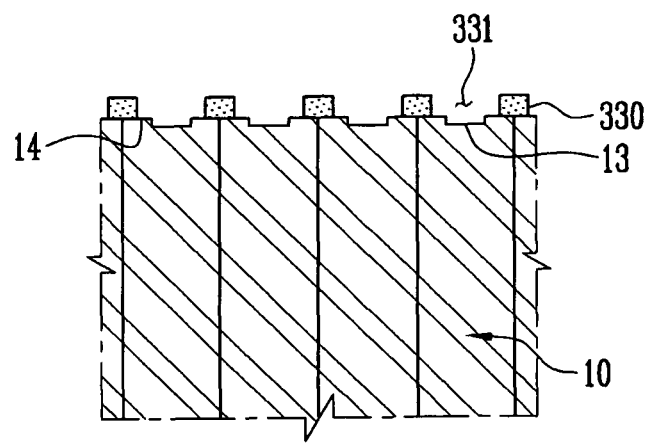
FIG. 5 illustrates a partial cross-sectional view of a battery module according to another embodiment.

FIGS. 4 and 5 illustrate views of other embodiments. In the following description, details of elements similar or identical to those described with reference to FIGS. 1 to 3 are not provided.

FIG. 4 illustrates a cross-sectional view of a battery module with an insulating member including an adhesive member. Referring to FIG. 4, the battery module according to this embodiment may include the plurality of battery cells 10 with the vents 13, the housing 110, and an insulating member 230 disposed on one sides of the battery cells 10. The insulating member 230 may have openings 231 corresponding to the vents 13.

The insulating member 230 according to this embodiment may further include an adhesive member 232. The insulating member 230 may be positioned on the cap plate 14 for the battery cells 10, and the adhesive member 232 may be disposed between the insulating member 230 and the cap plate 14. For example, the adhesive member 232 may be a double-sided tape.

The insulating member 230 may be made of, e.g., silicon or fluoride resin rubber, while the battery cells 10 may have metal surfaces. Therefore, use of the adhesive member 232 on the bottom to firmly fix the insulating member 230 and the battery cells 10 may facilitate attachment between the different materials of the insulating member 230 and the battery cells 10. Further, the adhesive member 232 may facilitate attachment of the insulating member 230 to the smooth surfaces of the battery cells 10. Furthermore, when the cover 120 is disposed on the insulating member 230, the insulating member 230 may be separated from the battery cells 10 by small external force and have the openings 231 of the insulating member 230 misaligned with respect to the vents 13. Therefore, the adhesive member 232 of the insulating member 230 according to this embodiment may minimize misalignment of the openings 231 with respect to the vents 13 during manufacturing, thereby decreasing interference of gas flow through the gas channel. It is preferable that the adhesive member 232 is disposed on portions of the insulating member 230 other than the openings 321, such that flow through the vents 13 is not affected, e.g., the adhesive member 232 may include openings corresponding to the openings 231.

FIG. 5 illustrates a cross-sectional of an insulating member having openings larger than the vents of the battery cells. Referring to FIG. 5, the battery module according to this embodiment may include the plurality of battery cells 10 having the vents 13 in the cap plate 14, the housing 110 accommodating the battery cells 10, and an insulating member 330 disposed on one sides of the battery cells 10. The insulating member 330 may have openings 331 corresponding to the vents 13.

In the insulating member 330 according to this embodiment, the openings 331 may be larger than the vents 13, e.g., the openings 331 may have larger widths than the vents 13 along the first direction. The insulating member 330 may contribute to forming a gas channel by the gas produced in the battery cells 10 while improving sealability between the battery cells 10 and the cover 120. Therefore, the insulating member 330 may have openings 331 corresponding, e.g., in terms of size and position, to the vents 13. It is preferable that the openings 331 are larger than the vents 13.

In detail, since the openings 331 are larger than the vents 13, the insulating member 330 may be easily positioned on the cap plate 14 for the battery cells 10. That is, as the openings 331 of the insulating member 330 are larger than the vents 13, the vents 13 may be easily aligned with the openings 331, thereby reducing the defect ratio. Further, as the openings 331 of the insulating member 330 increase in size, it may be possible to reduce the material cost. It is further noted that in the embodiment illustrated in FIG. 5, an adhesive member may be further disposed between the insulating member 330 and the battery cell 10, i.e., in portions other than the openings 331, as discussed previously with reference to FIG. 4.

As described above, according to example embodiments, a battery module may have vents of battery cells aligned with openings of an insulating member, so gas discharged from the battery cells may be efficiently discharged through the openings into an external gas channel. As such, the battery module may have a gas channel and an outlet to efficiently process the gas produced in the battery cells. Such a battery module may have improved productivity by efficiently controlling gas produced in the battery cells, due to a simplified manufacturing process. Further, the sealability of the gas channel may be improved, thereby efficiently preventing or substantially minimizing gas leakage along the circumference of the gas channel.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
a plurality of battery cells arranged in a first direction, the battery cells having vents;
a housing accommodating the battery cells;
an insulating member corresponding to the vents, the insulating member continuously extending in the first direction along at least a plurality of the vents; and
a cover directly on the insulating member,
wherein the cover and the insulating member define a gas channel therebetween, and the cover includes an outlet at one side of the cover, the outlet being connected to the gas channel and being configured to discharge gas, wherein:
the insulating member is an integrated unit extending continuously along all the vents, the cover defining a hollow space between a surface of the cover and the insulating member, the insulating member has a plurality of openings positioned to correspond to the vents, and
the cover covers the insulating member, the insulating member separating the cover from top surfaces of the battery cells along an entire perimeter of the cover.

2. The battery module as claimed in claim 1, wherein the openings of the insulating member are larger than the vents.

3. The battery cell as claimed in claim 1, wherein the insulating member is a gasket.

4. The battery cell as claimed in claim 1, wherein the insulating member is external to the battery cells and extends along the first direction to overlap the battery cells, the insulating member including a plurality of openings overlapping the vents.

5. The battery cell as claimed in claim 4, wherein widths of the openings of the insulating member are equal to or larger than widths of the vents.

6. The battery module as claimed in claim 1, wherein a width of the insulating member is larger than a width of the cover along a second direction, the second direction being different than the first direction.

7. The battery module as claimed in claim 1, wherein the cover has a hexahedral shape with an open side, the open side of the cover being completely open and positioned to face and contact the insulating member.

8. The battery module as claimed in claim 1, wherein the cover contacts the insulating member and encloses a space therewith, the space overlapping the vents of the battery cells.

9. The battery module as claimed in claim 8, wherein the insulating member is between the cover and the battery cells and includes a plurality of openings, the openings of the insulating member being aligned with corresponding vents.

10. The battery module as claimed in claim 8, wherein the space between the cover and the insulating member extends along all the vents of the battery cells, the space and the vents being in fluid communication with each other.

11. The battery module as claimed in claim 1, further comprising an adhesive member between the insulating member and the battery cell.

12. The battery module as claimed in claim 1, wherein the insulating member includes silicon or fluoride resin rubber.

13. The battery module as claimed in claim 1, wherein the housing includes:
a pair of end plates spatially spaced apart from each other to accommodate the battery cells; and
one or more connecting members that connect the pair of end plates.

14. The battery module as claimed in claim 13, wherein the connecting members include side brackets connecting the pair of end plates and a bottom bracket connecting bottoms of the end plates.

* * * * *